(12) United States Patent
West et al.

(10) Patent No.: US 11,598,867 B2
(45) Date of Patent: Mar. 7, 2023

(54) SEEKER SEQUENTIAL LOBING RADAR ANTENNA SYSTEM

(71) Applicant: Rockwell Collins, Inc., Cedar Rapids, IA (US)

(72) Inventors: James B. West, Cedar Rapids, IA (US); Keagan Peters, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 51 days.

(21) Appl. No.: 17/024,364

(22) Filed: Sep. 17, 2020

(65) Prior Publication Data

US 2022/0082678 A1    Mar. 17, 2022

(51) Int. Cl.
*G01S 13/42*    (2006.01)
*G01S 7/02*    (2006.01)
*F41G 7/22*    (2006.01)

(52) U.S. Cl.
CPC .......... *G01S 13/422* (2013.01); *F41G 7/2246* (2013.01); *F41G 7/2286* (2013.01); *G01S 7/028* (2021.05)

(58) Field of Classification Search
CPC ...... G01S 13/422; G01S 7/028; F41G 7/2246; F41G 7/2286; F41G 7/00
See application file for complete search history.

(56) References Cited

U.S. PATENT DOCUMENTS

| | | | |
|---|---|---|---|
| 3,243,804 A * | 3/1966 | Smith, Jr. | G01S 13/422 342/79 |
| 4,491,845 A | 1/1985 | Rothenberg | |
| 4,665,401 A * | 5/1987 | Garrard | F41G 7/2246 342/128 |
| 5,520,356 A * | 5/1996 | Ensley | B64G 1/409 244/171.1 |
| 6,703,982 B2 | 3/2004 | Park | |
| 8,497,812 B2 | 7/2013 | Harokopus et al. | |
| 8,704,724 B2 | 4/2014 | Höök | |
| 9,091,745 B2 | 7/2015 | Woodell et al. | |
| 9,419,329 B1 | 8/2016 | West et al. | |

(Continued)

FOREIGN PATENT DOCUMENTS

| | | |
|---|---|---|
| GB | 1403769 A | 8/1975 |
| GB | 2252207 B | 12/1992 |

(Continued)

OTHER PUBLICATIONS

Esfandiarpour et al., "Wideband planar horn antenna using substrate integrated waveguide technique", Microwave Conference Proceedings (APMC), 2011 Asia-Pacific, IEEE, Dec. 5, 2011 (Dec. 5, 2011), pp. 1969-1972, xp032153049, ISBN: 978-1-4577-2034-5.

*Primary Examiner* — Bernarr E Gregory
*Assistant Examiner* — Yonghong Li
(74) *Attorney, Agent, or Firm* — Suiter Swantz pc llo

(57) ABSTRACT

A radar antenna includes a plurality of horns in the annular space of a munition nose cone. The horns are disposed near the exterior surface of the nose cone. In a further aspect, the nose cone may be injection molded or additively manufactured so that the horns are embedded a known distance from the exterior surface. In a further aspect, the horns placed in either a transmit mode or a receive mode so as to maintain a minimum special separation between transmitting horns and receiving horns.

12 Claims, 9 Drawing Sheets

(56) References Cited

U.S. PATENT DOCUMENTS

| | | |
|---|---|---|
| 9,976,837 B2 | 5/2018 | Boiman et al. |
| 10,224,629 B2 | 3/2019 | West |
| 10,288,395 B1 | 5/2019 | Barton |
| 10,663,576 B2 | 5/2020 | Sundell |
| 2004/0263387 A1 | 12/2004 | Lalezari et al. |
| 2010/0052987 A1* | 3/2010 | Weinstein .............. H01Q 21/24 |
| | | 342/372 |
| 2018/0013203 A1 | 1/2018 | Wangsvick |
| 2019/0198985 A1 | 6/2019 | Seler et al. |
| 2019/0257919 A1 | 8/2019 | Marshall |
| 2020/0185830 A1 | 6/2020 | West |

FOREIGN PATENT DOCUMENTS

| | | |
|---|---|---|
| GB | 2553406 A | 3/2018 |
| KR | 100687908 B1 | 2/2007 |

* cited by examiner

SEEKER SEQUENTIAL LOBING RADAR ANTENNA SYSTEM

BACKGROUND

Very small airframes, such as missiles or other munitions, present a challenge when integrating radar systems. Such airframes provide very limited space to house such systems, and the operating environment is hostile to sensitive electronic components. It would be desirable to have a millimeter scale radar antenna system collated with and complementary to a short-wave infrared target location imaging system that is environmentally robust, and that does not compromise the aerodynamics of the platform.

SUMMARY

In one aspect, embodiments of the inventive concepts disclosed herein are directed to a radar antenna having a plurality of horns in the annular space of a munition nose cone. The horns are disposed near the exterior surface of the nose cone. In a further aspect, the nose cone may be injection molded or additively manufactured so that the horns are embedded a known distance from the exterior surface.

In a further aspect, the horns placed in either a transmit mode or a receive mode so as to maintain a minimum special separation between transmitting horns and receiving horns.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
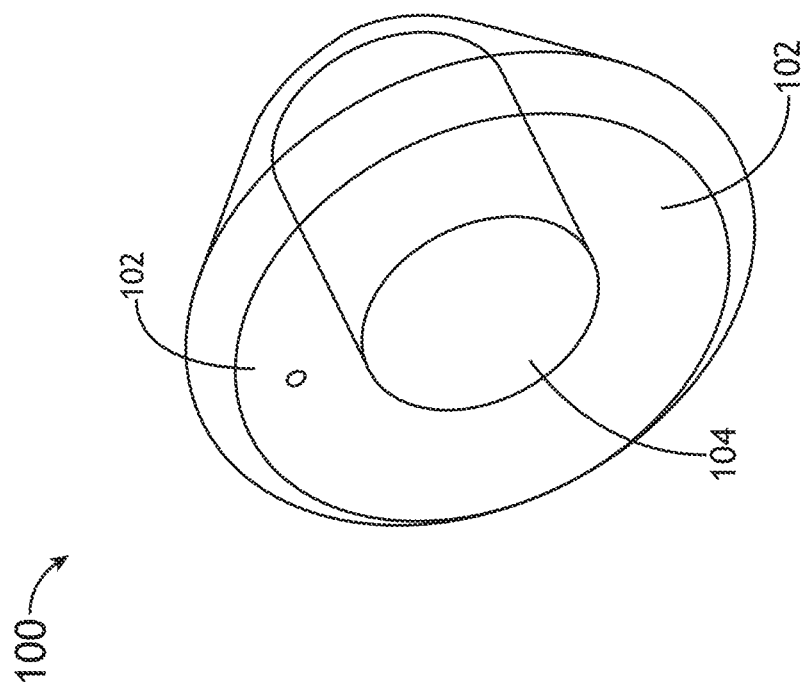
FIG. 1 shows a perspective view of a nose cone suitable for use in exemplary embodiments.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a radar antenna having a plurality of horns in the annular space of a munition nose cone. The horns are disposed near the exterior surface of the nose cone. In a further aspect, the nose cone may be injection molded or additively manufactured so that the horns are embedded a known distance from the exterior surface.

Referring to FIG. 1, a perspective view of a nose cone 100 suitable for use in exemplary embodiments is shown. The nose cone 100 may define a generally unused annular space 102 (which may be empty or filled with an inert material) and a central space 104 that may house certain electronic elements for the corresponding munition guidance system.

Figure 2:
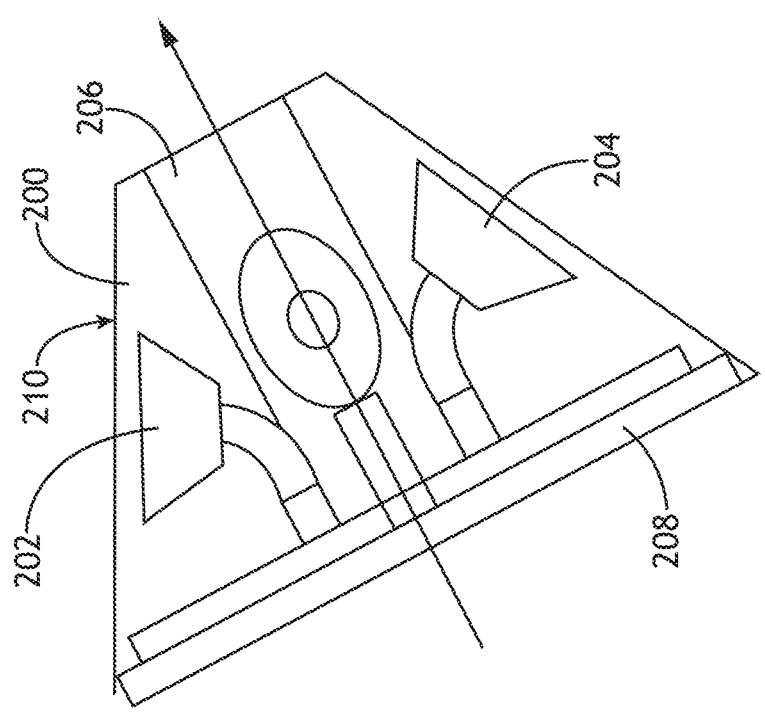
FIG. 2 shows a side view of a nose cone and radar antenna system according to an exemplary embodiment.

Referring to FIG. 2, a side view of a nose cone and radar antenna system according to an exemplary embodiment is shown. Where the nose cone defines a generally unused annular space 200, a plurality of actively driven radiating horns 202, 204 (wave guides) are disposed in the annular space 200. The radiating horns 202, 204 may be angularly disposed about a central axis defined by the nose cone, including a central space 206 that may house electronics for navigational components. The open, radiating portion of each radiating horn 202, 204 in a short-wave infrared system may be disposed proximal to an exterior surface 210 of the nose cone such that the remaining material of the nose cone between the radiating horns 202, 204 and open air (both its thickness and dielectric characteristics) is known and can be accounted for when sending and receiving signals. In at least one embodiment, the open, radiating portion of the radiating horns 202, 204 may be generally rhombic or quadrilateral. Furthermore, when fabricating the nose cone with an embedded radar antenna system, nose cone material may be injection molded or otherwise additively manufactured with the radiating horns 202, 204 in place such that the nose cone material may be structural, and hold the radiating horns 202, 204 in place. Additive manufacture may allow the nose cone with embedded radiating horns 202, 204 to be proportioned according to aerodynamic/mechanical considerations.

In at least one embodiment, a feed layer 208 is disposed at a bottom surface of the nose cone; for example, the feed layer 208 may comprise a metallized ground plane with multi-layered printed circuit boards. The feed layer 208 may be configured such that certain radiating horns 202, 204 are dedicated transmitters and other radiating horns 202, 204 are dedicated receivers. Alternatively, the feed layer 208 may be configured to switch some or all of the radiating horns 202, 204 between a transmit mode and receive mode.

In at least one embodiment, the disposition and sequential operation of the radiating horns 202, 204 enable sequential low aiming for the radar on a very limited volumetric platform. Embedding the radiating horns 202, 204 in the plastic dielectric material of the nose cone integrates and minimizes the parasitic effect of the plastic. It may be appreciated that completely embedding the radiating horns 202, 204 in the dielectric material of the nose cone provides structural stability and resistance to forces from acceleration.

Figure 3:
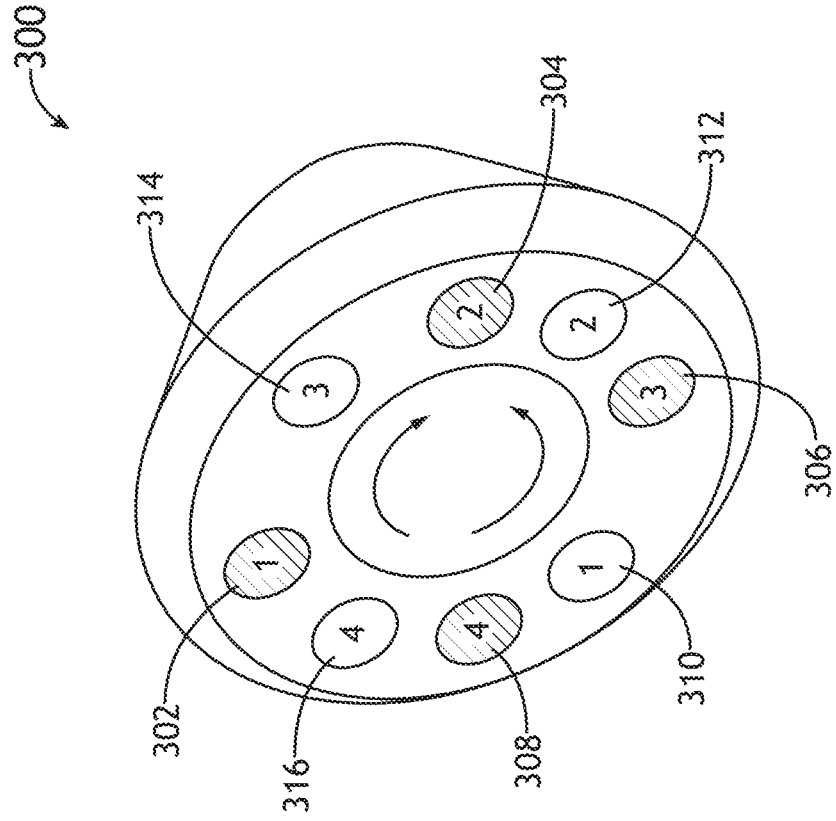
FIG. 3 shows a perspective view of a nose cone with representations transmit and receive spacing according to an exemplary embodiment.

Referring to FIG. 3, a perspective view of a nose cone 300 with representations transmit and receive spacing according to an exemplary embodiment is shown. Where the nose cone 300 includes a plurality of radiating horns angularly disposed in an annular space, certain of the radiating horns may be activated in a transmit mode while other radiating horns are activated in a receive mode such that radiating horns in different modes are spatially separated to avoid interference from coupling. In at least one embodiment, where radiating horns are dedicated to either a transmit mode or a receive mode, radiating horns at different positions 302, 304, 306, 308, 310, 312, 314, 316 are activated in various combinations; for example, a transmit radiating horn in a first transmit position 302 may be activated at the same as a receive radiating horn in a second receive position 312. As radiating horns are sequentially activated, such spacing is maintained to maximize spatial separation.

State of the art frequency-modulated continuous-wave radar systems include separate transmit and receive antennas disposed some distance apart to prevent self-jamming via electromagnetic isolation from spatial separation so that the transmitted signal doesn't lead back into and saturate the receive channel. By operating the radiating horns sequentially in a clockwise or anticlockwise fashion, a sequential lobing radiation pattern may be generated while maintaining spatial separation. In at least one embodiment, channels may be operating in a counter-rotating fashion. Embodiments are suitable for both frequency-modulated continuous-wave radar systems and pulsed radar systems.

In at least one embodiment, radiating horns may be activated in sequence to produce a circular polarization via horns that can intrinsically generate circular polarization, either by direct generation or by the appropriately phase shifted vertical polarizing and horizontal polarizing horn embodiments. Circular polarization further enhances channel isolation.

In at least one embodiment, receive and transmit channels are commutated in a synchronous way so as to maximizing separation between transmitting and receiving antennas at any instant in time. Certain sequencing may apply only to frequency modulated continuous wave systems. Pulsed systems may only have four radiating horns to maximize aperture size; sequencing may include time-division multiplexing, applicable to both receive and transmit modes. In at least one embodiment, In at least one embodiment, receive and transmit channels are commutated asynchronously to improve antenna isolation.

Signal strength varies as a function of beam switching and pattern gain. Embodiments of the disclosed may be extendable to conopulse (2-channel), i.e., 2D Monopulse architectures.

Figure 4A:
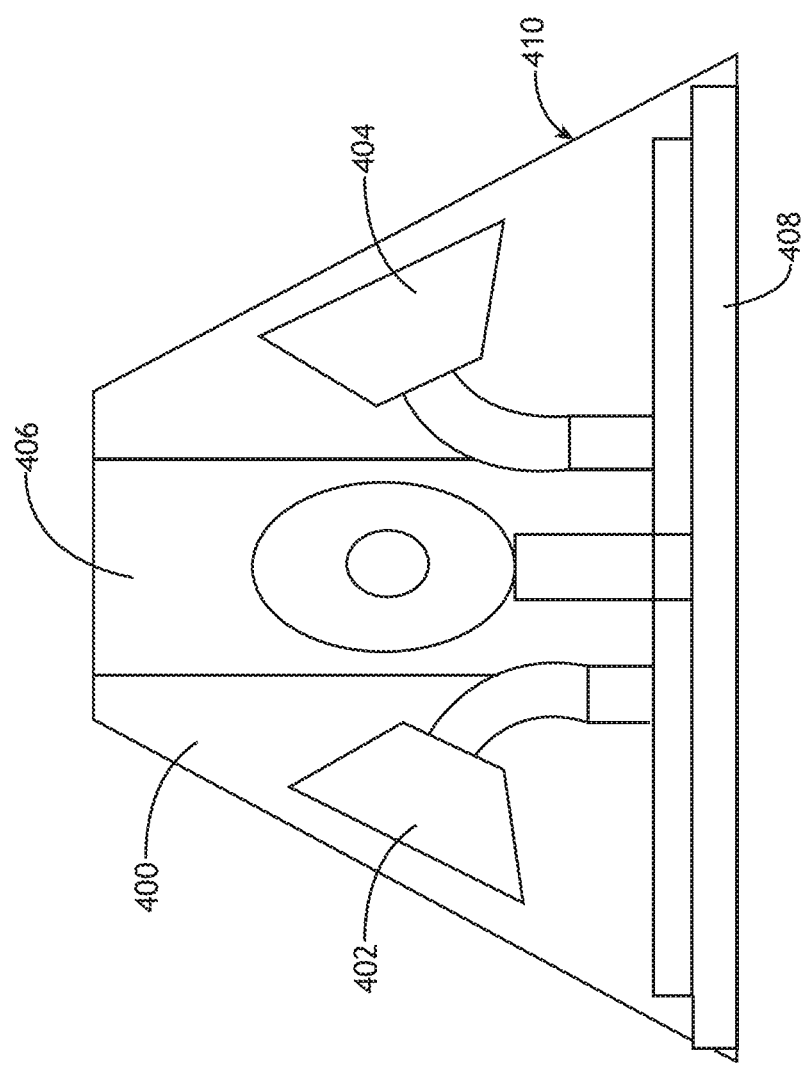
FIG. 4A shows a side view of a nose cone and radar antenna system according to an exemplary embodiment.
Figure 4B:
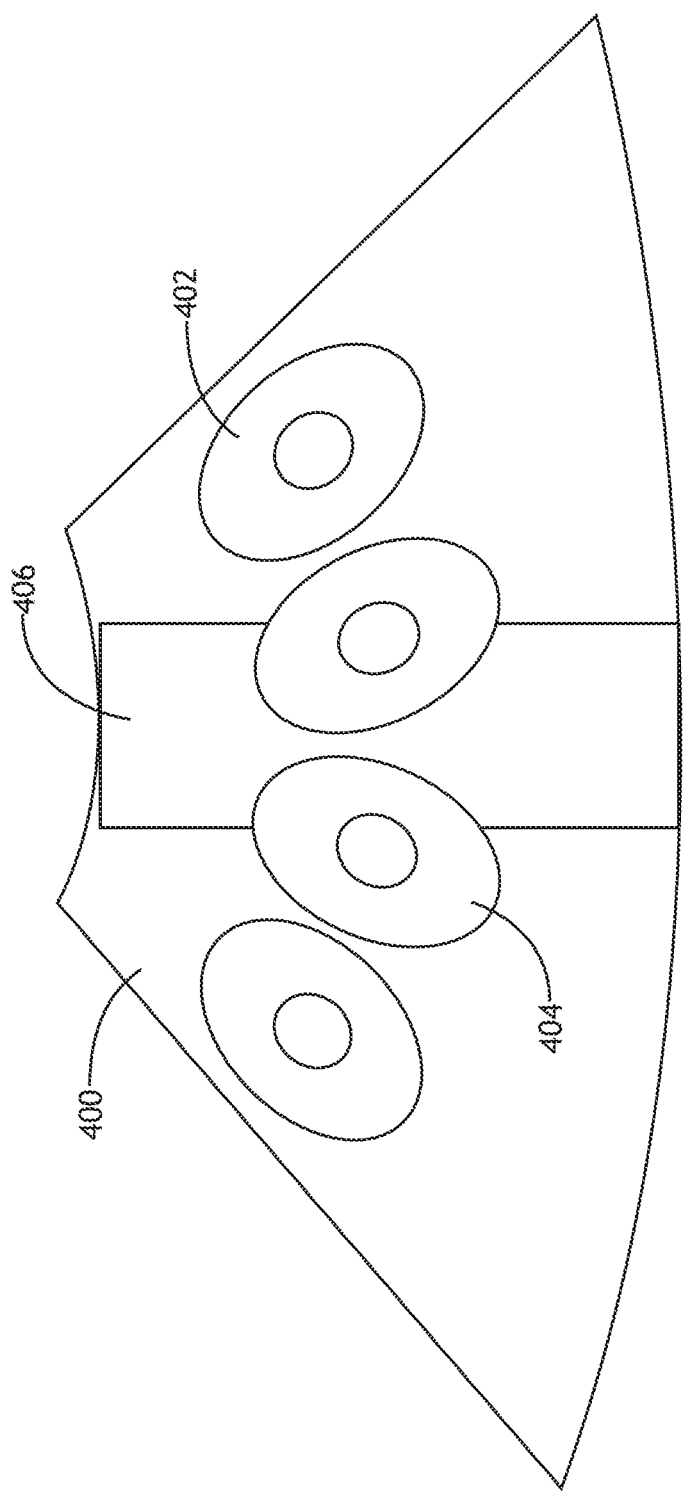
FIG. 4B shows an unfurled view of a nose cone and radar antenna system according to an exemplary embodiment.

Referring to FIGS. 4A-4B, a side view and unfurled view of a nose cone and radar antenna system according to an exemplary embodiment are shown. Where the nose cone defines a generally unused annular space 400, a plurality of generally ovoid radiating horns 402, 404 are angularly disposed in the annular space 400 about a central axis defined by the nose cone, including a central space 406 that may house electronics for navigational components. The ovoid, open, radiating portion of each radiating horn 402, 404 may be disposed proximal to an exterior surface 410 of the nose cone such that the remaining material of the nose cone between the radiating horns 402, 404 and open air (both its thickness and electromagnetic insulating characteristics) is known and can be accounted for when sending and receiving signals. Radiating horns 402, 404 are disposed to maximize surface area for element gain. The use of horn radiating elements allow a wide range of gain/beam width flexibility according to system requirements.

In at least one embodiment, a feed layer 408 is disposed at a bottom surface of the nose cone. The feed layer 408 may be configured such that certain radiating horns 402, 404 are dedicated transmitters and other radiating horns 402, 404 are dedicated receivers. Alternatively, the feed layer 408 may be configured to switch some or all of the radiating horns 402, 404 between a transmit mode and receive mode. In at least one embodiment, an upper portion of the feed layer 408 is a metalized ground plane that blends into the antenna waveguide feeds. A bottom portion of the feed layer 408 is a multi-layered printed circuit board.

Figure 5A:
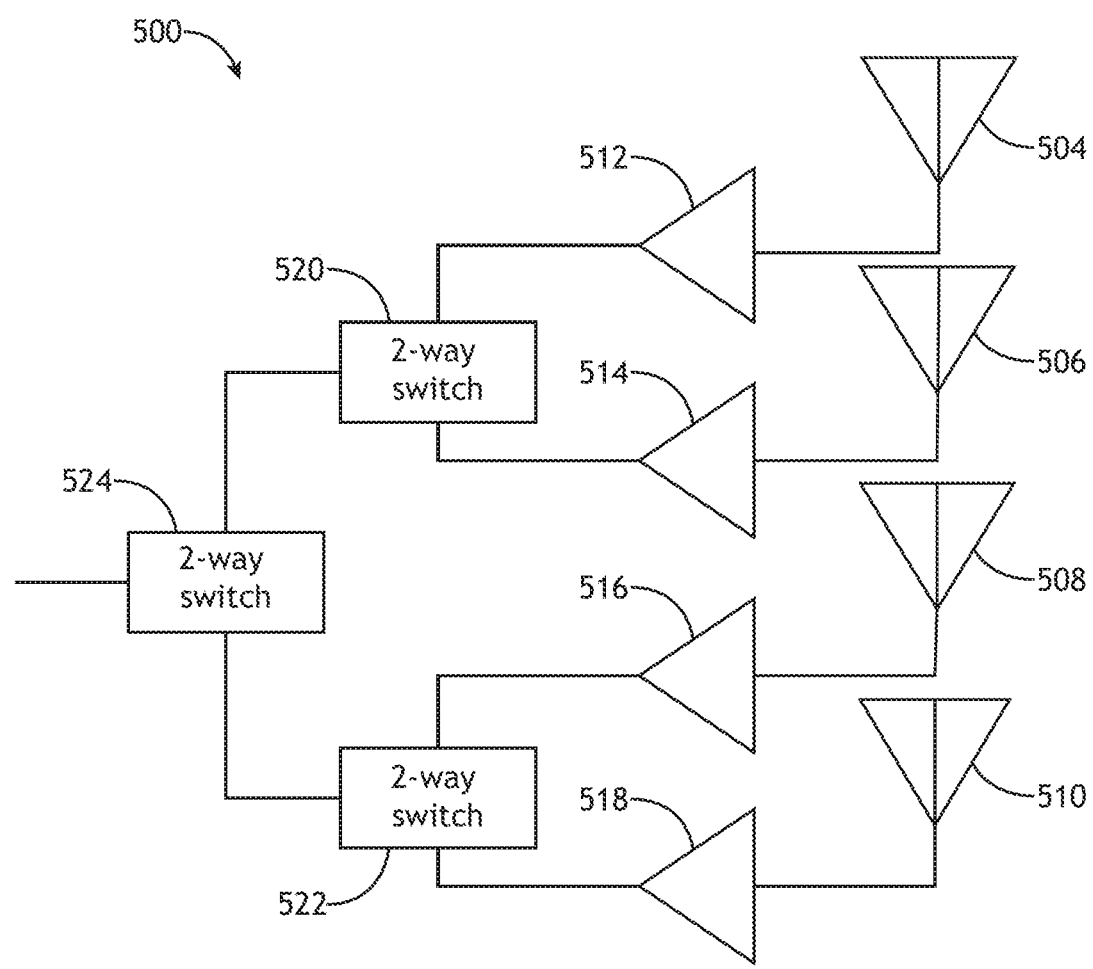
FIG. 5A shows a block representation of a radar antenna system in a receive mode according to an exemplary embodiment.
Figure 5B:
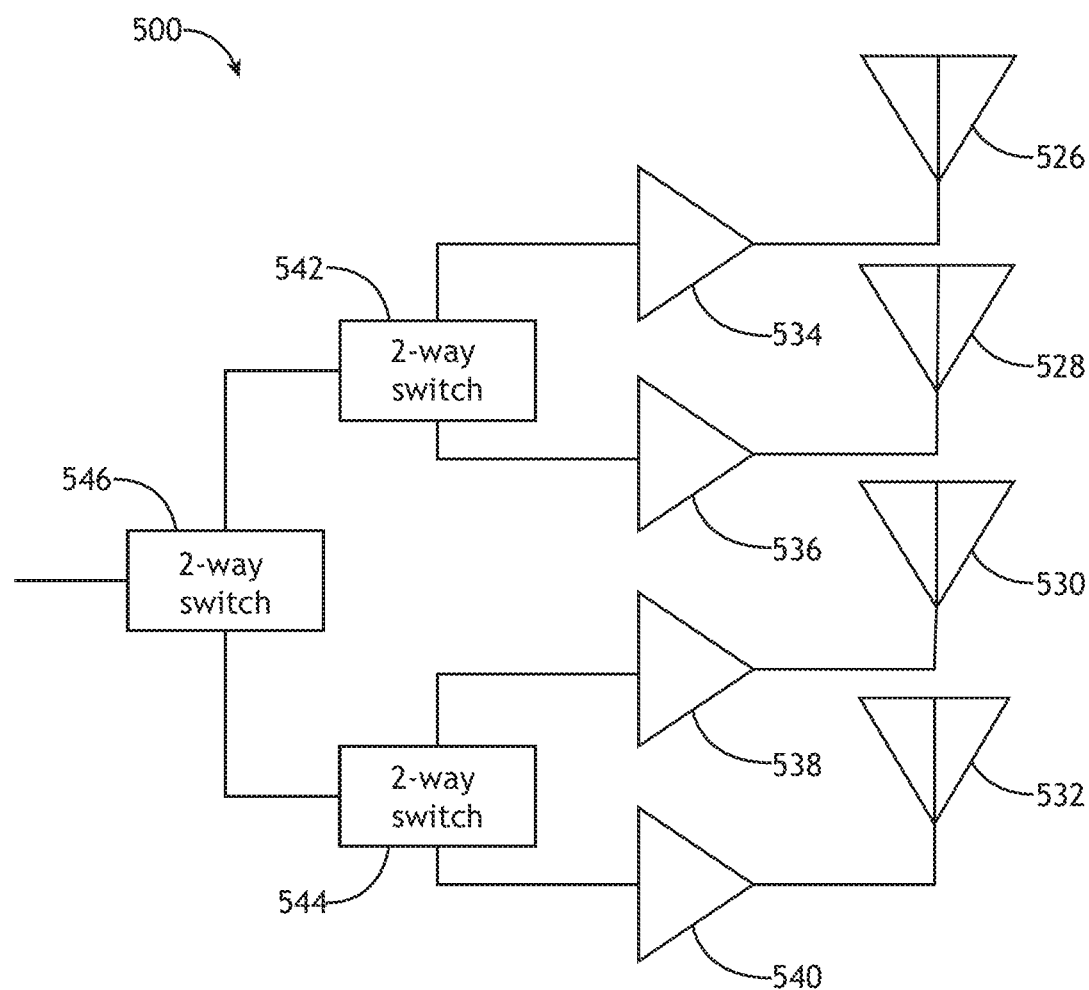
FIG. 5B shows a block representation of a radar antenna system in a transmit mode according to an exemplary embodiment.

Referring to FIG. 5A-5B, block representations of a radar antenna system in a receive mode 500 and transmit mode 502 according to an exemplary embodiment is shown. In a receive mode 500, each radiating horn 504, 506, 507, 510 is in data communication with a corresponding amplifier 512, 514, 516, 518. One or more switches 520, 522, 524 allow each radiating horn 504, 506, 507, 510 to be individually addressed. Likewise, in a transmit mode 502, each radiating horn 526, 528, 530, 532 is in data communication with a corresponding amplifier 534, 536, 538, 540. One or more switches 542, 544, 546 allow each radiating horn 534, 536, 538, 540 to be individually addressed. Switches 542, 544, 546 may be RFIC Ka band switches.

In at least one embodiment, a nose cone includes separate radiating horns 504, 506, 507, 510, 534, 536, 538, 540 and corresponding hardware to simultaneously operate in a receive mode 500 and a transmit mode 502. The radar antenna system may operate the switches 520, 522, 524, 542, 544, 546 such that active receive mode 500 radiating horns 504, 506, 507, 510 and active transmit mode 502 radiating horns 534, 536, 538, 540 are spatially separated to prevent interference from coupling. The operation of receive mode 500 switches 520, 522, 524 may be algorithmically linked to the operation of transmit mode 502 switches 542, 544, 546 to maintain such spatial separation.

Figure 6:
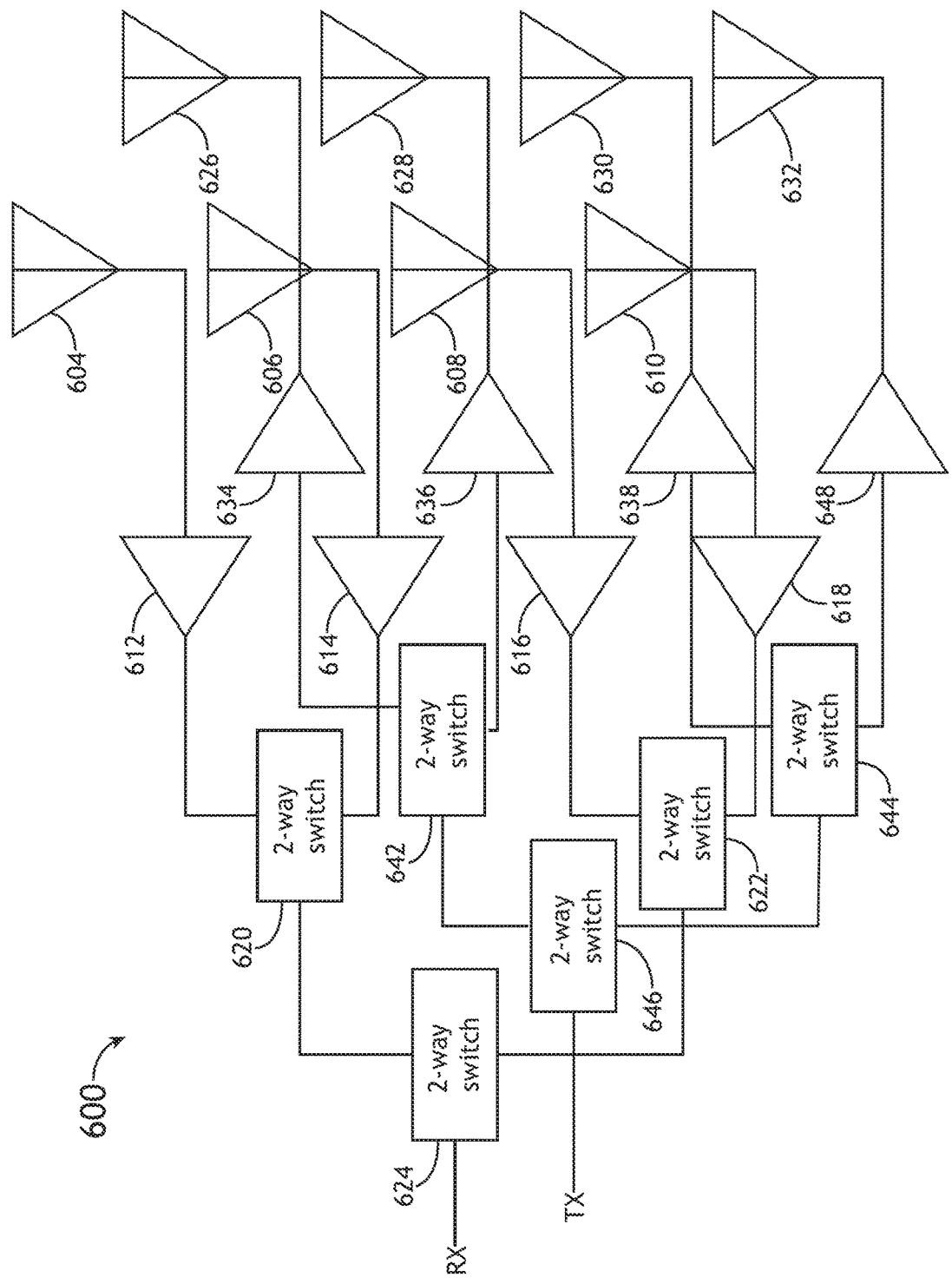
FIG. 6 shows a block representation of a radar antenna system with transmit and receive channels.

Referring to FIG. 6, a block representation of a radar antenna system 600 with transmit and receive channels is shown. The receive channel comprises radiating horns 604, 606, 607, 610, each in data communication with a corresponding amplifier 612, 614, 616, 618 and one or more switches 620, 622, 624 to allow each radiating horn 604, 606, 607, 610 to be individually addressed. Likewise, the transmit channel comprises radiating horns 626, 628, 630, 632, each in data communication with a corresponding amplifier 634, 636, 638, 640 and one or more switches 642, 644, 646 to allow each radiating horn 634, 636, 638, 640 to be individually addressed. The receive channel radiating horns 604, 606, 607, 610 may be interleaved with the transmit channel radiating horns 626, 628, 630, 632 in their angular disposition about a central axis of a nose cone.

In at least one embodiment, the radar antenna system 600 may operate the switches 620, 622, 624, 642, 644, 646 such that active receive mode 600 radiating horns 604, 606, 607, 610 and active transmit mode 602 radiating horns 634, 636, 638, 640 are spatially separated to prevent interference from coupling. The operation of receive mode 600 switches 620, 622, 624 may be algorithmically linked to the operation of transmit mode 602 switches 642, 644, 646 to maintain such spatial separation.

Figure 7:
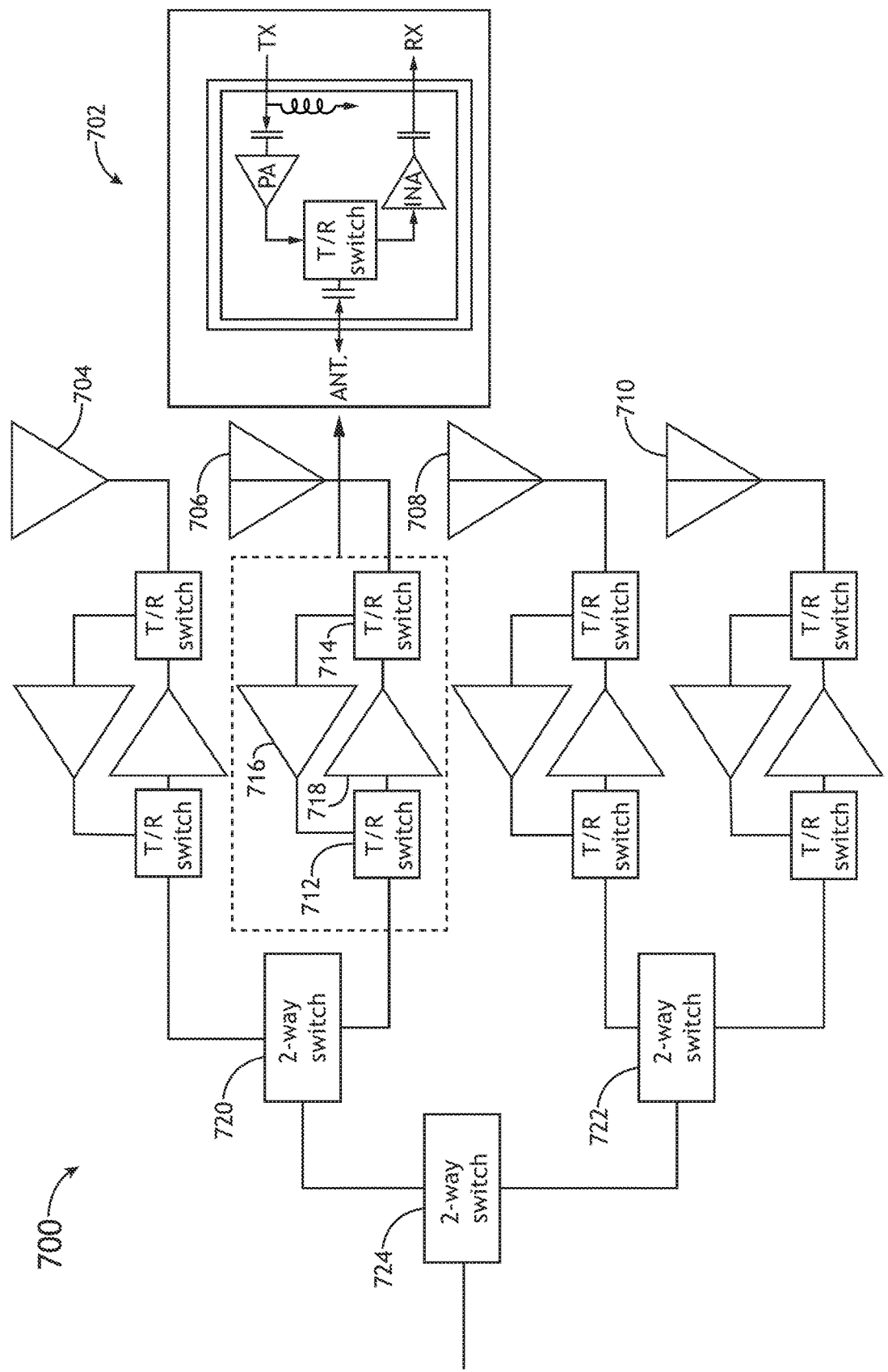
FIG. 7 shows a block representation of a switchable radar antenna system.

Referring to FIG. 7, a block representation of a switchable radar antenna system 700 is shown. The switchable radar antenna system 700 includes a plurality of radiating horns 704, 706, 708, 710, each configured to operate in a transmit mode or a receive mode based on the configuration of a mode switch system 702. In at least one embodiment, each mode switch system 702 comprises a feeder transmit/receive switch 712 connected to one or more switches 720, 722, 724 connecting the switchable radar antenna system 700 to a feed layer, a receive amplifier 716, and a transmit amplifier 718. The feeder transmit/receive switch 712 places the corresponding radiating horn channel in either a transmit mode or receive mode. In at least one embodiment, a radiating horn transmit/receive switch 714 may also be employed to isolate the transmit channel from the receive channel for each radiating horn 704, 706, 708, 710. Each radiating horn 704, 706, 708, 710 may be operated in a receive mode or transmit mode, independently of the other radiating horn 704, 706, 708, 710.

Embodiments of the present disclosure enable long range targeting outside of the short-wave infrared operational range and conical scan/sequential lobing for a precision target tracking system. Antenna systems according to exemplary embodiment are compatible with either frequency modulated continuous wave radar or pulsed radar architectures.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A radar antenna comprising:
a plurality of radiating horns, each disposed around an axis defined by a nose cone; and
a feed layer connected to each of the radiating horns, wherein:
a first set of radiating horns and corresponding feed layer circuitry is dedicated to a sequential receive channel;
a second set of radiating horns and corresponding feed layer circuitry is dedicated to a sequential transmit channel;
the first set of radiating horns and second set of radiating horns are interleaved around the axis;
the plurality of radiating horns embedded in a dielectric material comprising the nose cone;
the feed layer is configured to sequentially activate each of the plurality of radiating horns to produce a conical scan/sequential lobing radiation pattern;
the first set of radiating horns are activated sequentially in a clockwise fashion and the second set of radiating horns are activated sequentially in an anti-clockwise fashion; and
radiating horns in the first set of radiating horns and the second set of radiating horns are activated to produce a circular polarization via phase shifted vertical polarizing and horizontal polarizing radiating horns.

2. The radar antenna of claim 1, wherein the feed layer is configured to simultaneously activate radiating horns in the first set and radiating horns in the second set, wherein the activated radiating horns are spatially separated to minimize coupling.

3. The radar antenna of claim 2, wherein radiating horns are activated asynchronously.

4. The radar antenna of claim 1, wherein the radar antenna is configured for a frequency modulated continuous wave radar.

5. The radar antenna of claim 1, wherein the feed layer is configured to switchably activate each radiating horn in either a transmit mode or a receive mode.

6. The radar antenna of claim 5, wherein the radar antenna is configured for a pulsed radar.

7. A nose cone comprising:
a plurality of radiating horns, each disposed in an annular space around an axis defined by the nose cone; and
a feed layer connected to each of the radiating horns, wherein:
a first set of radiating horns and corresponding feed layer circuitry is dedicated to a sequential receive channel;
a second set of radiating horns and corresponding feed layer circuitry is dedicated to a sequential transmit channel;

the first set of radiating horns and second set of radiating horns are interleaved around the axis;

the plurality of radiating horns embedded in a dielectric material comprising the nose cone;

the feed layer is configured to sequentially activate each of the plurality of radiating horns to produce a conical scan/sequential lobing radiation pattern;

the first set of radiating horns are activated sequentially in a clockwise fashion and the second set of radiating horns are activated sequentially in an anti-clockwise fashion; and radiating horns in the first set of radiating horns and the second set of radiating horns are activated to produce a circular polarization via phase shifted vertical polarizing and horizontal polarizing radiating horns.

8. The nose cone of claim 7, wherein the feed layer is configured to simultaneously activate radiating horns in the first set and radiating horns in the second set, wherein the activated radiating horns are spatially separated to minimize coupling.

9. The nose cone of claim 8, wherein radiating horns are activated asynchronously.

10. The nose cone of claim 7, wherein the radiating horn is configured for a frequency modulated continuous wave radar.

11. The nose cone of claim 7, wherein the feed layer is configured to switchably activate each radiating horn in either a transmit mode or a receive mode.

12. The nose cone of claim 11, wherein the radiating horn is configured for a pulsed radar.

* * * * *